United States Patent [19]

Swigger

[11] 4,231,873
[45] Nov. 4, 1980

[54] UNDERWATER LIQUID CONTAINMENT SYSTEM

[76] Inventor: Michael P. Swigger, 580 Erbes Rd., Thousand Oaks, Calif. 91360

[21] Appl. No.: 830,581

[22] Filed: Sep. 6, 1977

[51] Int. Cl.² .......................... B63B 35/00; E02B 1/00
[52] U.S. Cl. ..................................... 210/170; 114/256; 119/3; 137/236.5; 165/45; 210/205; 405/52; 405/210
[58] Field of Search ..................... 61/0.5, 1 R, 21, 101; 114/0.5 T, 256, 257; 43/7, 8; 119/3; 137/236.5; 141/1, 10; 165/45; 210/83, 170, 242 R, 205; 405/52, 210

[56] References Cited

U.S. PATENT DOCUMENTS

| | | | |
|---|---|---|---|
| 82,651 | 9/1868 | Somes | 165/45 |
| 1,292,794 | 1/1919 | Johnson | 61/21 X |
| 3,067,712 | 12/1962 | Doerpinghaus | 61/1 F |
| 3,230,967 | 1/1966 | Castro | 137/236 |
| 3,435,793 | 4/1969 | Shurtleff | 114/0.5 T |
| 3,517,513 | 6/1970 | Renshaw et al. | 61/1 R |
| 3,535,883 | 10/1970 | Manning | 61/101 |
| 3,572,278 | 3/1971 | Knapp et al. | 61/101 X |
| 3,590,887 | 7/1971 | Quase | 137/236 X |
| 4,046,178 | 9/1977 | Case | 61/1 R X |

FOREIGN PATENT DOCUMENTS 2165058 8/1973 France ......................................... 119/3

Primary Examiner—David H. Corbin
Attorney, Agent, or Firm—Kenneth J. Hovet

[57] ABSTRACT

An underwater system for confining large volumes of liquids comprising an elongated sock-like closed container immersed in a body of water. The container has thin flexible sidewalls and is provided with an opening located adjacent the water surface. It is contemplated that the system will be used for liquids having a specific gravity about that of water so that no substantial pressure differential will exist across the container sidewalls.

2 Claims, 4 Drawing Figures

UNDERWATER LIQUID CONTAINMENT SYSTEM

BACKGROUND OF THE INVENTION

1. Field of the Invention

The present invention is concerned with containment, use and storage of large volumes of liquids and, more particularly, to a containment system located in a body of water.

2. Description of the Prior Art

The devisement of underwater storage systems has been described in U.S. Pat. Nos. 2,383,840, 2,894,268, and 3,113,699. These systems contemplated the storage of petroleum products such as gasoline and fuel oil and the delivery of such to sea-going vessels and the like. Because petroleum products have a specific gravity much less than water, it is necessary to provide anchoring means to prevent the storage containers from floating to the surface. It is also necessary to construct the containers to withstand the pressure differential created by the buoyancy force of the storaged petroleum products in water. This force becomes extremely significant at depths greater than about thirty feet such that the container construction costs become prohibitive at depths therebeyond.

To withstand the effects of water currents and buoyancy forces, elaborate steel housings have been developed to enclose flexible containers or rigid steel tanks have been used which are secured to concrete bases. Obviously, the corrosive forces of water, particularly salt water, render the above systems not feasible for the containment of water wherein large volumes must be stored inexpensively.

SUMMARY OF THE INVENTION

A novel system is provided for the containment, utilization and storage of water or other liquids having a similar specific gravity, within a body of water. Containment and storage is effected inexpensively with elongated thin-walled flexible containers which are provided with a top portion having an opening maintained at about water level with buoyant means. The buoyant means may include a floating structure upon which is supported a header assembly and conduit means in communication with the opening for transporting liquids into and out of the container.

More than one container can be used to store liquids and/or function as a waste water treatment system by tranfer of treated and decanted liquid to successive containers. Alternatively, a container may be provided with an inner net lining and used as a fish or plant cultivation system. When the contents of the container are to be examined or removed, the net may be elevated for easy access.

It is contemplated that the present system will be adapted to accumulate and store overflow or excess fresh water from inland reservoirs or drainage systems. A single container may hold 50,000 or less to over six million gallons of water depending on the depth of water in which it is immersed and the practical limits of container construction and handling.

DESCRIPTION OF PREFERRED EMBODIMENTS

Figure 1:
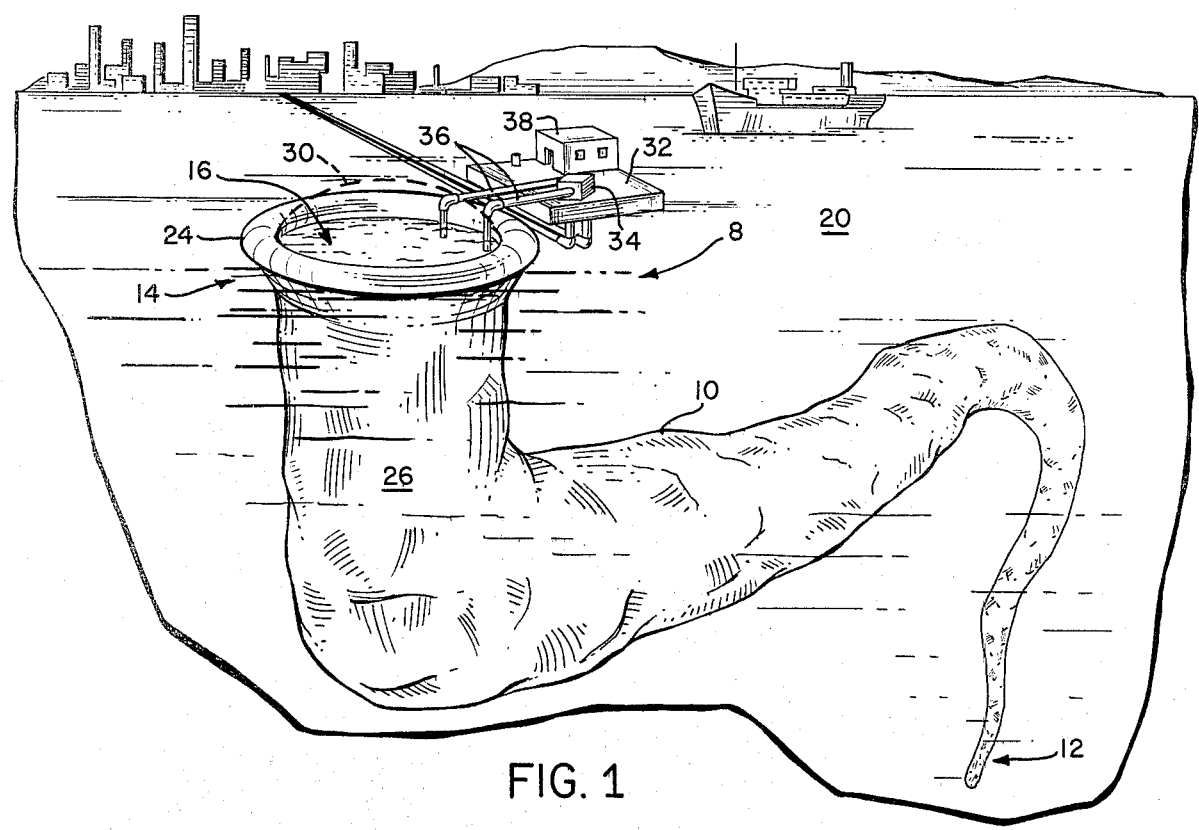
FIG. 1 is a perspective view of an embodiment of the invention showing an elongated flexible storage container descending from the surface of a large body of water.

Referring now to FIG. 1 of the drawings, which depicts a containment system 8, an elongated flexible container 10 is shown having a closed bottom portion 12 and a top portion 14 having an opening 16. Substantially the entire container is immersed within a large body of water 20 and located offshore a distance dictated by the depth and bottom structure of the body of water relative to the cost of transporting liquids to and from land.

The top portion 14 is supported at sea level with a floating structure 24. The floating structure serves to maintain the opening 16 above water level so that the liquid contents 26 may be protected from contamination from the surrounding body of water 120. To further inhibit such contamination a cover 30 shown in phantom is provided over the opening 16.

It will be appreciated that the floating structure 24 may be incorporated into or used in conjunction with a platform 32 which may overlie the opening 16 and thereby take the place of cover 30. The platform 32 includes a header assembly 34 which is connected to conduit means 36.

It is contemplated that the header assembly will include the necessary pipe and connecting assemblies such as control valves, pressure relief valves, and miscellaneous interconnecting assemblies to facilitate the flow of liquids into and out of the container through the conduit means. It is further contemplated that pumping means may be included within the header assembly supported by the platform 32 or such pumping means may be located on land. Depending on the size of the floating structure the platform may also include a small building structure 38 for housing accessory equipment and/or for enclosing the header assembly for protection from the effects of the environment.

In the embodiment shown in FIG. 1 the length of the bag is depicted as being on the order of about one-half mile long with a diameter of about 20 feet. A container of this size may be filled with about six million gallons of fresh water. The container may be constructed of extruded and blown plastic film which is impermeable to liquids such as polyethylene or polyvinylchloride. Optionally, the plastic walls may be reinforced with nylon or may be biaxially oriented during extrusion for insuring sidewall strength against the rigors and hazards of being immersed in a large body of water.

The container may be wound into a roll in a well-known manner following the extrusion thereof and simply unwound by gravity by allowing it to free fall and descend into the body of water while maintaining the top portion above water.

If the container is used to contain fresh water having a specific gravity of about 62.3 pounds per cubic foot and is immersed in sea water having a specific gravity of approximately 62.5 pounds per cubic foot, there will not be any significant pressure differential across the sidewalls.

It will be noted, however, that a slight head will be created as the container is filled to overcome the resistance of filling the container and because of the slight difference in specific gravities. As such, the floating structure is preferably provided with an inner wall of a height sufficient to provide for such head and further to inhibit the overflow of surrounding salt water resulting from high waves or the like. In this regard it will be understood that the opening 16 is in communication with the atmosphere such that there is no pressure whatsoever placed upon the water contained within the system. Since the specific gravities are substantially similar and because of the lack of positive pressure against the contained liquid, there will be no pressure differential across the walls of the container and there will be no buoyant forces operating against the container to force it to the water surface. As such, the container can be constructed with the aforementioned conventional extruded plastic film without the necessity of steel housings or concrete foundations.

To facilitate the off-loading of the container into the body of water the bottom portion may be provided with a small amount of ballast (not shown) to facilitate its downward descent. It will also be noted that even though a floating structure and platform are shown, the opening may be located at the overflow viaduct of a dam or reservoir with the container body extending outwardly into a lake or ocean. In this manner, the use of long pipes for transporting liquid into and out of the container immersed offshore will be obviated as well as the use of pumping means to fill the container.

Figure 2:
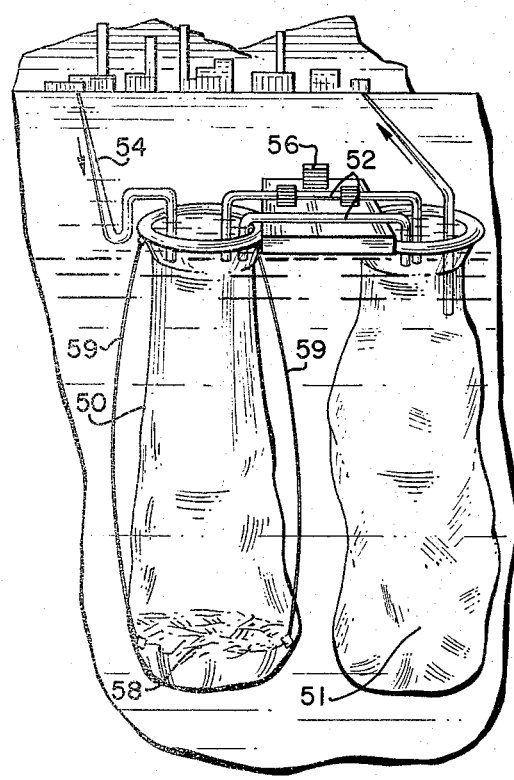
FIG. 2 is a perspective view of an embodiment of the invention showing two containers similar to the container of FIG. 1 connected in series with conduit means for the successive treatment of waste water.

Referring now to FIG. 2, there is shown two containers 50 and 51 which are connected in series by interconnecting pipes 52. In this embodiment, waste water from land will flow through pipe 54 into the interior of container 50. Appropriate settling agents and chemicals may be injected by control means 56 through pipe 52 to cause impurities contained in the waste water to precipitate and settle to the container bottom and form a sludge 58. After a suitable settling period, the clarified liquid in the upper portion of the container may be decanted therefrom by conduit 52 and transferred to container 51. Control means 56 may again be used to inject disinfecting chemicals or the like to treat the clarified liquid for subsequent use as irrigation water. Depending on the desirability of more treatment, additional containers may be connected in series for further handling prior to use on shore. The primary container 50 is optionally provided with connecting lines 59 to the bottom portion thereof. This is to facilitate the removal of the sediments 58 by allowing the bottom to be drawn near the top opening for dispensation of the sediment materials. It is further contemplated that the container 50 may be removed from the conduit structure and transported several miles out to the open sea for dispersal of the sediments by simply inverting the container.

Figure 3:
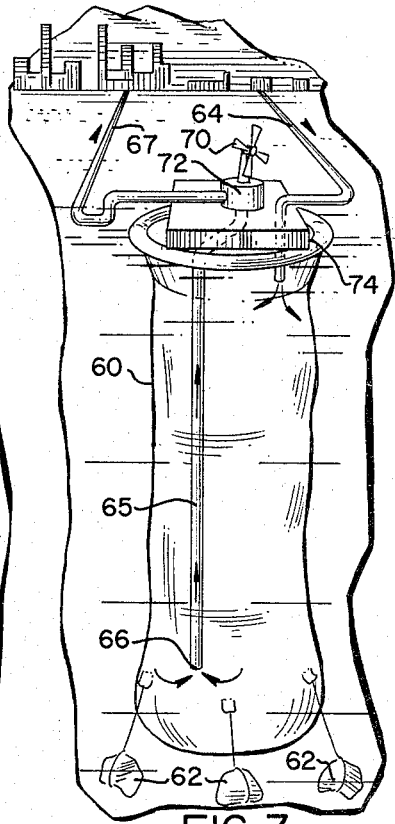
FIG. 3 is a perspective view of another embodiment of the invention showing a container similar to the container of FIG. 1 provided with an inlet pipe near the container bottom for extracting cooled water therefrom.

FIG. 3 is a schematic perspective depicting the use of container 60 as a heat exchanger. In this embodiment, ballast or weight means are secured to the lower portion thereof to maintain the container in a substantially vertical position within the ocean. It is contemplated that the container shall be over a thousand feet in length so that water contained in the bottom portion will be cooled by the ambient cool ocean water prevalent at such depths. In this system hot water inlet pipe 64 delivers warm water to the top portion of the container and stand pipe 65, having an opening 66 near the bottom of the container, is used as an inlet for cool water and delivery through a pumping assembly 72 back to land by pipe 67. To minimize the energy required for this system, the flow of hot water to the container may be accomplished by syphon means from cooling tower water means inland ( not shown). The power for pumping of water back to such cooling tower means may be effected by a windmill system 70 supported on floating platform 74. Such a system for pumping water from deep wells is well known. Its use near an ocean shoreline is especially feasible due to the almost constant winds that exist at such locations.

Figure 4:
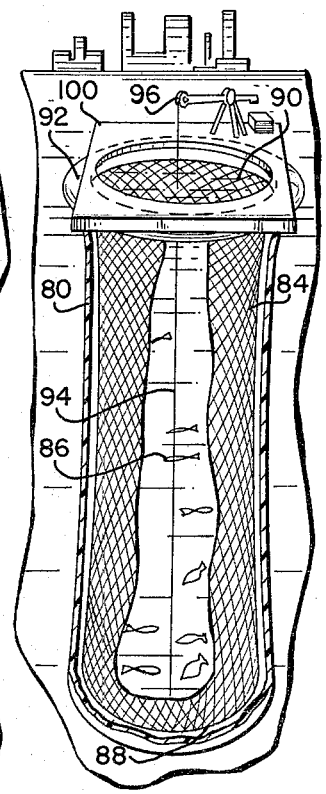
FIG. 4 is a perspective view of a further embodiment of the invention showing a container similar to the container of FIG. 1 provided with an inner closed end netting for retrieving cultured fish.

The perspective of FIG. 4 depicts a container 80 immersed in a body of water and provided with a coextensive closed-end inner netting 84. The container may hold fresh water and the surrounding water may be salt water or vice versa depending on the type of fish 86 being cultivated therein. The netting may be of woven thread or may be a wire network. The system is provided with means to elevate the bottom 88 to provide access to the fish by lifting them near the top opening 90. This is accomplished with a line 94 connecting the bottom portion 88 of net 84. A boom and winch means 96 is used to raise the net and retrieve the cultured fish.

The top opening is provided with a floating structure 92 in the same manner as that shown in FIG. 1. As aforementioned, the opening 90 may be enclosed with a floating platform 100 or a cover (not shown) as desired.

It will be understood that the system may also be used to cultivate plants and the like whereby the liquid within the container will be provided with an enriched nutrient solution to encourage the plant growth therein.

It will be appreciated that the invention as described in the aforementioned embodiments provides special advantages for society in view of the growing overcrowded land conditions wherein the need for large reservoirs, steel tanks and the like will be obviated. Additionally, because of the recurrent extremes in weather, the system will provide an inexpensive means for the storage of fresh water during periods of excess for use during later periods of drought. Because the containment system is maintained at about atmospheric pressure via an opening above sea water, there is no pressure differential or buoyant forces operating against the container sidewalls. As such, the miscellaneous super-structures described by the prior art and the expensive materials of construction of the prior art containers are eliminated.

Note that while preferred embodiments have been described, it will be apparent that other modifications and improvements may be made to the essential elements of the invention without departing from the spirit and scope thereof. Accordingly, it is to be understood that the invention is not to be limited by the specific illustrative embodiments but only by the scope of the appended claims.

I claim:

1. A liquid containment system comprising:
    at least two elongated closed containers constructed of flexible fluid impermeable material for storing liquids;

said containers oriented in a generally upright manner proximate each other with each having a top portion and a bottom portion and being substantially entirely immersed within a surrounding body of water;

said top portions including an opening providing access to the interior thereof and being supported in an uppermost position by buoyant means connected thereto for communication to the atmosphere;

said buoyant means comprising a floating structure which supports a header assembly and conduit means in communication with each of said openings for transporting liquids into and out of said containers, said header assembly providing a plurality of passageways for transporting liquid in a predetermined manner through said conduit means;

said containers being adapted to dispense solid materials accumulated in the bottom portion thereof wherein one of said containers includes connecting lines secured to the bottom portion thereof for drawing said portion near said top opening to facilitate the dispensation of said solid materials.

2. The system of claim 1 including control means for adding appropriate chemicals to said containers for the treatment of liquid contained therein.

* * * * *